United States Patent [19]

Guo

[11] Patent Number: 5,543,483
[45] Date of Patent: Aug. 6, 1996

[54] HYDROXY-FUNCTIONAL ALLYL TERPOLYMERS

[75] Inventor: Shao-Hua Guo, West Goshen, Pa.

[73] Assignee: ARCO Chemical Technology, L.P., Greenville, Del.

[21] Appl. No.: 440,865

[22] Filed: May 15, 1995

Related U.S. Application Data

[63] Continuation-in-part of Ser. No. 309,699, Sep. 21, 1994, Pat. No. 5,480,954.

[51] Int. Cl.$^6$ .................................................. C08F 218/08
[52] U.S. Cl. ............................................. 526/330; 525/118
[58] Field of Search .............................. 526/330; 525/118

[56] References Cited

U.S. PATENT DOCUMENTS 3,876,588  4/1975  Sackmann et al. .

*Primary Examiner*—Joseph L. Schofer
*Assistant Examiner*—N. Sarofim
*Attorney, Agent, or Firm*—Jonathan L. Schuchardt

[57] ABSTRACT

Hydroxy-functional allyl terpolymers are disclosed. The terpolymers comprise recurring units of an allyl ester, an allylic alcohols or propoxylated allylic alcohol, and a vinyl monomer. The high hydroxyl group content and favorable solubility characteristics make the terpolymers easy to formulate into many polymer products, including polyurethanes, polyesters, melamines, alkyds, uralkyds, and other thermoset polymers.

7 Claims, No Drawings

HYDROXY-FUNCTIONAL ALLYL TERPOLYMERS

CROSS-REFERENCE TO RELATED APPLICATION

This application is a continuation-in-part of application Ser. No. 08/309,699, filed Sep. 21, 1994, now U.S. Pat. No. 5,480,954.

FIELD OF THE INVENTION

The invention relates to terpolymers of allyl esters, allylic alcohols, and vinyl monomers. The terpolymers, which have a high concentration of hydroxyl groups, are useful in many types of curable polymer systems, such as coatings and adhesives.

BACKGROUND OF THE INVENTION

Allyl alcohol, a well-known monomer, is available commercially from isomerization of propylene oxide. Ethylenic polymerization of allylic alcohols with other olefins is a potential route to polymers that have a high concentration of primary hydroxyl groups. Such copolymers are potentially valuable polymers intermediates because they will cure rapidly with isocyanates, anhydrides, and melamine resins to give useful thermoset articles.

Few allylic alcohol copolymers have actually become commercially important. Poly(allyl alcohol), for example, is not widely used in spite of its high concentration of primary hydroxyl groups because of its poor solubility in most common organic solvents. Copolymers of allyl alcohol and typical vinyl monomers such as styrene are known, but because allyl alcohol reacts much more slowly than vinyl monomers, a large excess of allyl alcohol is needed in the copolymerization to get a desirable hydroxyl group content.

Allyl ester polymers are known, but because allyl esters polymerize slowly with even high levels of free-radical initiators to give polymers of only low molecular weight, few allyl esters have any industrial use for polymers and copolymers (see S. R. Sandler and W. Karo, *Polymer Syntheses*, Vol. III (1980), Chapter 8, "Polymerization of Allyl Esters," pp. 248–294, at page 263).

Sackmann et al. (U.S. Pat. No. 3,876,588) disclose a terpolymer of allyl alcohol, allyl acetate, and maleic anhydride, but do not describe terpolymers of allylic alcohols, allyl esters, and vinyl monomers New hydroxy-functional allyl terpolymers are needed. Particularly valuable terpolymers would be easy to prepare and would have a high concentration of hydroxyl groups. Preferably, the terpolymers would be soluble in common organic solvents to enable easy formulation into polyurethanes, polyesters, melamines, alkyd coatings, uralkyds, and other thermoset polymers.

SUMMARY OF THE INVENTION

The invention is a hydroxy-functional allyl terpolymer. The terpolymer comprises recurring units of (a) an allyl ester of the formula $CH_2=CR'-CH_2-O-CO-R$ in which R is hydrogen or a saturated linear, branched, or cyclic $C_1-C_{30}$ alkyl, aryl, or aralkyl group, and R' is selected from the group consisting of hydrogen and $C_1-C_5$ alkyl; (b) an allylic alcohol of the formula $CH_2=CR'-CH_2-OH$ in which R' is selected from the group consisting of hydrogen and $C_1-C_5$ alkyl; and (c) a vinyl monomer. The terpolymer has an average hydroxyl functionality within the range of about 2 to about 10, and a number average molecular weight within the range of about 300 to about 15,000.

The invention also includes terpolymers as described above, but substituting for the allylic alcohol component, a propoxylated allylic alcohol of the formula $CH_2=CR'-CH_2-(A)_n-OH$ in which A is an oxypropylene group, R' is selected from the group consisting of hydrogen and $C_1-C_5$ alkyl, and n, which is the average number of oxypropylene groups in the propoxylated allylic alcohol, has a value less than or equal to 2. These terpolymers also have average hydroxyl functionalities within the range of about 2 to about 10, and number average molecular weights within the range of about 300 to about 15,000.

The terpolymers of the invention are easy to prepare. Compared with poly(allyl alcohol), the terpolymers of the invention have much better solubility in common organic solvents. The high hydroxyl group content and favorable solubility characteristics make the hydroxy-functional allyl terpolymers easy to formulate into many polymer products, including polyurethanes, polyesters, melamines, alkyds, uralkyds, and other thermoset polymers.

DETAILED DESCRIPTION OF THE INVENTION

Terpolymers of the invention comprise recurring units of; (1) an allyl ester; (2) an allylic alcohol or a propoxylated allylic alcohol; and (3) a vinyl monomer.

Allyl esters suitable in the invention have the general structure: $CH_2=CR'-CH_2-O-CO-R$ in which R is hydrogen or a saturated linear, branched, or cyclic $C_1-C_{30}$ alkyl, aryl, or aralkyl group, and R' is selected from the group consisting of hydrogen and $C_1-C_5$ alkyl. Suitable allyl esters include, but are not limited to allyl formate, allyl acetate, allyl butyrate, allyl benzoate, methallyl acetate, and the like, and mixtures thereof. Particularly preferred are allyl esters derived from allyl alcohol and methallyl alcohol. Most preferred are $C_1-C_5$ alkyl esters of allyl alcohol and methallyl alcohol.

Allylic alcohols suitable in the invention have the general structure: $CH_2=CR'-CH_2-OH$ in which R' is selected from the group consisting of hydrogen and $C_1-C_5$ alkyl. Suitable allylic alcohols include, but are not limited to, allyl alcohol, methallyl alcohol, 2-ethyl-2-propen-1-ol, and the like, and mixtures thereof. Allyl alcohol and methallyl alcohol are preferred.

The terpolymers of the invention can include, instead of or in addition to an allylic alcohol, recurring units of a propoxylated allylic alcohol. Suitable propoxylated allylic alcohols have the formula $CH_2=CR'-CH_2-(A)_n-OH$ in which A is an oxypropylene group, R' is selected from the group consisting of hydrogen and $C_1-C_5$ alkyl, and n, which is the average number of oxypropylene groups in the propoxylated allylic alcohol, has a value less than or equal to 2. The oxypropylene groups in the propoxylated allylic alcohols have one or both of the structures $-OCH(CH_3)-CH_2-$ and $-O-CH_2-CH(CH_3)-$, which will depend on the method of synthesis.

Suitable propoxylated allylic alcohols can be prepared by reacting an allylic alcohol with up to about 2 equivalents of propylene oxide in the presence of a basic catalyst as described, for example, in U.S. Pat. Nos. 3,268,561 and 4,618,703, the teachings of which are incorporated herein by reference. As will be apparent to those skilled in the art, suitable propoxylated allylic alcohols can also be made by acid catalysis, as described, for example, in *J. Am. Chem. Soc.* 71 (1949) 1152.

Terpolymers of the invention include recurring units of a vinyl monomer. Vinyl monomers useful in the invention are compounds having a terminal ethylenic unsaturation available for polymerization with the other comonomers. Preferred vinyl monomers include vinyl aromatic monomers, vinyl halides, vinyl ethers, acrylonitrile, methacrylonitrile, acrylamide, methacrylamide, acrylates, methacrylates, and vinyl esters. Particularly preferred are vinyl aromatic monomers and acrylates or methacrylates.

The relative proportions of allyl ester, allylic alcohol or propoxylated allylic alcohol, and vinyl monomer used to make the terpolymers are not critical. The actual proportions used will generally depend upon many factors, including, for example, the desired hydroxyl end group content of the terpolymer, the desired solubility characteristics, the identity of the R groups, and other considerations. Generally, the terpolymers will comprise from about 1 to about 98 wt. % of the allyl ester, from about 1 to about 98 wt. % of the allylic alcohol or propoxylated allylic alcohol, and from about 1 to about 98 wt. % of the vinyl monomer. More preferred terpolymers will have from about 5 to about 85 wt. % of the allyl ester, from about 5 to about 85 wt. % of the allylic alcohol or propoxylated allylic alcohol, and from about 10 to about 90 wt. % of the vinyl monomer.

The terpolymers of the invention have average hydroxyl functionalities within the range of about 2 to about 10, preferably from about 3 to about 6. The terpolymers will have number average molecular weights within the range of about 300 to about 15,000. A more preferred range is from about 500 to about 3000.

Preferred terpolymers of the invention will have hydroxyl numbers within the range of about 10 to about 950 mg KOH/g. A more preferred range is from about 25 to about 500 mg KOH/g.

The hydroxy-functional allyl terpolymers of the invention are made by free-radical polymerization. Usually, the allyl monomers are combined with a portion of the vinyl monomer and heated in the presence of a free-radical initiator at a temperature effective to polymerize the monomers. The remaining vinyl monomer is continuously added while maintaining a constant ratio of allyl monomer to vinyl monomer to produce relatively uniform allyl terpolymers. Suitable free-radical initiators are the peroxide and azo-type initiators well known to those skilled in the art. Peroxide initiators are preferred. Examples include hydrogen peroxide, benzoyl peroxide, di-tert-butylperoxide, tert-butylhydroperoxide, tert-butylperbenzoate, azobis(isobutyronitrile)(AIBN), and the like.

The monomers and free-radical initiator can be combined and reacted in any desired way. We found that improved yields can be achieved, however, if the initiator is added gradually to the reaction mixture during the course of the polymerization. Thus, it is preferred to introduce the initiator either continuously or intermittently to the polymerization reaction mixture.

The process can be performed at any temperature effective to initiate free-radical polymerization. Generally, it is preferred to perform the reaction at a temperature within the range of about 90° C. to about 200° C. A more preferred range is from about 125° C. to about 180° C.; most preferred is the range of about 135° C. to about 165° C.

The polymerizations can be performed at any suitable pressure. Generally, it is preferred to perform the polymerizations at pressures greater than 1 atmosphere, particularly when allyl alcohol is a reactant. Particularly preferred is the pressure range from about 20 to about 500 psi.

Optionally, a solvent is included in the polymerization. Suitable solvents are those in which the monomers, free-radical initiator, and polymeric reaction products are soluble. Preferred solvents for the polymerization include alcohols, ethers, esters, glycols, glycol ethers, and glycol ether esters. Aliphatic hydrocarbons are generally not suitable because the polymer products are usually not soluble in aliphatic hydrocarbons.

The hydroxy-functional allyl terpolymers of the invention are soluble in a wide variety of organic solvents, including, for example, ethers, glycol ethers, glycol ether esters, ketones, esters, and aromatic hydrocarbons. Specific examples include diethyl ether, tetrahydrofuran, butyl methyl ether, propylene glycol tert-butyl ether, propylene glycol n-butyl ether, propylene glycol methyl ether acetate, acetone, methyl ethyl ketone, methyl isobutyl ketone, methyl amyl ketone, ethyl acetate, butyl acetate, toluene, and xylenes, and mixtures thereof. The favorable solubility characteristics of these terpolymers give formulators of adhesives, coatings, elastomers, and sealants great flexibility.

Hydroxy-functional allyl terpolymers are useful in a variety of applications, including, for example, polyesters, polyurethanes, alkyds, uralkyds, acrylates, melamine resins, and other thermoset polymers. These uses are described in more detail below, and in the examples.

The invention includes thermoset polyesters that are the reaction products of the hydroxy-functional allyl terpolymers of the invention and an anhydride or a di- or polycarboxylic acid. The use of such a reaction to prepare a thermoset polyester coating from an allyl alcohol/allyl butyrate/methyl methacrylate terpolymer is shown in Example 9 below. Suitable anhydrides and carboxylic acids are those commonly used in the polyester industry. Examples include, but are not limited to, phthalic anhydride, phthalic acid, maleic anhydride, maleic acid, adipic acid, isophthalic acid, terephthalic acid, sebacic acid, succinic acid, trimellitic anhydride, and the like, and mixtures thereof. Other suitable methods for making thermoset polyesters are described in U.S. Pat. No. 3,457,324, the teachings of which are incorporated herein by reference.

A polyurethane composition is made by reacting a hydroxy-functional allyl terpolymer of the invention with a di- or polyisocyanate or an isocyanate-terminated prepolymer. Prepolymers derived from the terpolymers of the invention can be used. Optionally, a low molecular weight chain extender (diol, diamine, or the like) is included. Suitable di- or polyisocyanates are those well known in the polyurethane industry, and include, for example, toluene diisocyanate, MDI, polymeric MDIs, carbodiimide-modified MDIs, hydrogenated MDIs, isophorone diisocyanate, and the like. Isocyanate-terminated prepolymers are made in the usual way from a polyisocyanate and a polyether polyol, polyester polyol, or the like. The polyurethane is formulated at any desired NCO index. If desired, all of the available NCO groups are reacted with hydroxy groups from the terpolymers and any chain extenders. Alternatively, an excess of NCO groups remain in the product, as in a moisture-cured polyurethane. Many types of polyurethane products can be made, including, for example, adhesives, sealants, coatings, and elastomers. Examples 4–6 below illustrate polyurethane coatings prepared from terpolymers of the invention. Other suitable methods for making polyurethane compositions are described in U.S. Pat. No. 2,965,615, the teachings of which are incorporated herein by reference.

The invention includes alkyd compositions prepared by reacting a hydroxy-functional allyl terpolymer of the invention with an unsaturated fatty acid. Suitable unsaturated fatty acids are those known in the art as useful for alkyd resins, and include, for example, oleic acid, ricinoleic acid, linoleic acid, licanic acid, and the like, and mixtures thereof. Mixtures of unsaturated fatty acids and saturated fatty acids such as lauric acid or palmitic acid can also be used. The alkyd resins are particularly useful for making alkyd coatings. For example, a terpolymer, or a mixture of a terpolymer and glycerin or another low molecular weight polyol, is first partially esterified with an unsaturated fatty acid to give an alkyd resin. The resin is then combined with an organic solvent, and the resin solution is stored until needed. A drying agent such as cobalt acetate is added to the solution of alkyd resin, the solution is spread onto a surface, the solvent evaporates, and the resin cures leaving an alkyd coating of the invention. Example 10 below shows one way to make an alkyd coating of the invention. Other suitable methods for making alkyd resins and coatings are described in U.S. Pat. No. 3,423,341, the teachings of which are incorporated herein by reference.

Instead of combining the alkyd resin with an organic solvent, the resin can be dispersed in water to make a water-based alkyd coating formulation. To improve the water dispersability of the alkyd resin, a free hydroxyl group in the alkyd resin can be converted to a salt. For example, the alkyd resin can be reacted with phthalic anhydride to give a resin that contains phthalic acid residues; addition of sodium hydroxide makes the sodium phthalate salt, and provides a water-dispersable alkyd resin derived from the hydroxy-functional allyl terpolymer. See, for example, U.S. Pat. No. 3,483,152.

The invention includes polyurethane-modified alkyds (uralkyds) prepared from the hydroxy-functional allyl terpolymers. These resins are especially valuable for making uralkyd coatings. The terpolymer is first partially esterified with an unsaturated fatty acid (described above) to give an alkyd resin. The alkyd resin, which contains some free hydroxyl groups, is reacted with a di- or polyisocyanate (described above) to give a prepolymer. The prepolymer is then reacted with a chain extender, atmospheric moisture, or additional alkyd resin to give a uralkyd coating. Other suitable methods for making uralkyd resins and coatings are described in U.S. Pat. No. 3,267,058, the teachings of which are incorporated herein by reference.

The invention includes thermoset polymers prepared by reacting the hydroxy-functional allyl terpolymers of the invention with a thermoplastic polymer or a crosslinking agent. For example, melamine-based polymers, especially coatings, can be prepared by reacting the terpolymers with melamine resins. Suitable melamine resins include commercial grade hexamethoxymethylmelamines, such as, for example, CYMEL 303 crosslinking agent, a product of American Cyanamid Company. Examples 7 and 8 below illustrate the preparation of melamine coatings from terpolymers of the invention. A thermoset resin is obtained by reacting the terpolymers of the invention with a crosslinkable thermoplastic resin. Suitable crosslinkable thermoplastic resins are anhydride or carboxylic acid-containing polymers such as, for example, polyacrylic acid, polymethacrylic acid, isobutylene-maleic anhydride copolymers, and styrene-maleic anhydride copolymers.

An acrylate composition of the invention is prepared by reacting some or all of the hydroxyl groups of the hydroxy-functional allyl terpolymers with an acrylic acid or acrylic acid derivative. Suitable acrylic acids and derivatives include acrylic acid, methacrylic acid, acryloyl chloride, methacryloyl chloride, methyl acrylate, methyl methacrylate, and the like. Example 11 below illustrates this application. Suitable methods for preparing acrylates are described, for example, in U.S. Pat. No. 2,917,538, the teachings of which are incorporated herein by reference.

The favorable solubility characteristics of the hydroxy-functional allyl terpolymers of the invention make them well-suited for blending with other polymers. The terpolymers are easily blended with, for example, polyether polyols, phenolic resins, acrylates, and epoxy resins, and the blends can be used in the applications described earlier. The terpolymers can also be used as compatibilizers to improve the miscibility of polymer mixtures. In contrast, poly(allyl alcohol) is generally not compatible with other polymers, and cannot be blended with polymers or used as a compatibilizer for other polymers.

The following examples merely illustrate the invention. Those skilled in the art will recognize many variations that are within the spirit of the invention and scope of the claims.

EXAMPLE 1

Preparation of a Terpolymer from Allyl Alcohol, Allyl Butyrate, and Methyl Methacrylate Allyl alcohol (150 g), allyl butyrate (225 g), methyl methacrylate (45 g), and T-HYDRO 70 initiator (t-butyl hydroperoxide, 70% in water, product of ARCO Chemical Company, 28 g) are charged to a one-liter stainless-steel reactor equipped with agitator, steam heating jacket, temperature controller, nitrogen purge device, vacuum distillation device, and addition pump. Methyl methacrylate (180 g) and T-HYDRO 70 initiator (15 g) are mixed, cooled to 5° C., and charged into the addition pump. After purging three times with nitrogen, the reactor is sealed, and the reactor contents are heated to 140° C. The mixture of methyl methacrylate and T-HYDRO 70 initiator is pumped into the reactor during the polymerization at a decreasing rate. The addition rates are: 50 g/h for the first hour, 45 g/h for the second hour, 40 g/h for the third hour, 35 g/h for the fourth hour, and 25 g/h for the fifth hour. Heating continues at 140° C. for an additional 30 min. following completion of the monomer addition. Unreacted monomers are removed by vacuum distillation, leaving 344 g of terpolymer having Mw=2800, Mn=1410, and hydroxyl number=91.9 mg KOH/g.

EXAMPLE 2

Preparation of a Terpolymer from Allyl Alcohol, Allyl Acetate, and Methyl Methacrylate Allyl alcohol (150 g), allyl acetate (225 g), methyl methacrylate (45 g), and T-HYDRO 70 initiator (t-butyl hydroperoxide, 70% in water, product of ARCO Chemical Company, 28 g) are charged to a one-liter stainless-steel reactor equipped with agitator, steam heating jacket, temperature controller, nitrogen purge device, vacuum distillation device, and addition pump. Methyl methacrylate (180 g) and T-HYDRO 70 initiator (15 g) are mixed, cooled to 5° C., and charged into the addition pump. After purging three times with nitrogen, the reactor is sealed, and the reactor contents are heated to 140° C. The mixture of methyl methacrylate and T-HYDRO 70 initiator is pumped into the reactor during the polymerization at a decreasing rate. The addition rates are: 50 g/h for the first hour, 45 g/h for the second hour, 40 g/h for the third hour, 35 g/h for the fourth hour, and 25 g/h for the fifth hour. Heating continues at 140° C. for an additional 30 min. following completion of the monomer addition. Unreacted monomers are removed by vacuum distillation, leaving 346 g of terpolymer having Mw=2700, Mn=1350, and hydroxyl number=88.3 mg KOH/g.

EXAMPLE 3

Preparation of a Terpolymer from Propoxylated Allyl Alcohol, Allyl Butyrate, and Methyl Methacrylate Allyl alcohol propoxylate (average of 1.6 oxypropylene units, 176 g), allyl butyrate (88 g), methyl methacrylate (88 g), and di-tert-butylperoxide (5.0 g) are charged to a one-liter stainless steel reactor equipped with agitator, steam heating jacket, temperature controller, nitrogen purge device, vacuum distillation device, and addition pump. Methyl methacrylate (265 g) and di-tert-butylperoxide (15 g) are mixed and charged to the addition pump. After purging three times with nitrogen, the reactor is sealed, and the reactor contents are heated to 140° C. The mixture of methyl methacrylate and di-t-butyl peroxide is pumped into the reactor during the polymerization at a decreasing rate. The addition rates are: 71 g/h for the first hour, 64 g/h for the second hour, 56 g/h for the third hour, 47 g/h for the fourth hour, and 40 g/h for the fifth hour. Heating continues at 140° C. for an additional 30 min. following completion of the monomer addition. Unreacted monomers are removed by vacuum distillation, leaving 540 g of terpolymer having Mw=2950, Mn=1580, and hydroxyl number=88.8 mg KOH/g.

EXAMPLE 4

Polyurethane Coating (Baking)

The terpolymer of Example 1 (70 g) is dissolved in methyl amyl ketone (30 g) to form a 70% terpolymer solution. To 17.5 g of this solution is added an aliphatic polyisocyanate based on hexamethylene diisocyanate (HDI) (DESMODUR N-3390, product of Miles, 4.5 g). After mixing well, a portion of the coating solution is poured onto clean steel panels and is drawn down to a uniform wet film of thickness about 0.003" with a doctor blade. The panels are dried in a hood for 30 min., and are then baked in an oven at 135° C. for 1 h. Testing of the panels gives the following results: Reverse impact: 10 in/lb; Pencil hardness: H; Gloss at 20°:91; Gloss at 60°:105; T-bend: passes without cracking; Cross-cut adhesion (ASTM D-3359):5.

EXAMPLE 5

Polyurethane Coating (Ambient Temperature Curing)

The formulation of Example 4 is prepared, except that dibutyltin dilaurate (0.005% based on total amount of binders) is included. The panels are dried in a hood at room temperature (25° C.). The panels are tack-free within 5 h, and fully dried within 24 h. Testing of the panels gives the following results: Pencil hardness: H; Gloss at 20°:94; Gloss at 60°:105.

EXAMPLE 6

Polyurethane Coating (Baking)

The terpolymer of Example 3 (73 g) is dissolved in methyl amyl ketone (27 g) to form a 73% terpolymer solution. To 17.3 parts of this solution is added, methyl ethyl ketone (MEK) (3 g), an aliphatic polyisocyanate based on hexamethylene diisocyanate (HDI) (DESMODUR N-3390, product of Miles, 4.3 g), and 0.108 g of a 1% MEK solution of dibutyltin dilaurate. After mixing well, a portion of the coating solution is poured onto clean steel panels and is drawn down to a uniform wet film of thickness about 0.003" with a doctor blade. The panels are dried in a hood for 30 min, and then baked in an oven at 135° C. for 1 h. Testing of the panels gives the following results: Reverse impact: 10 in/lb; Pencil hardness: H; Gloss at 20°:91; Gloss at 60°:105; T-bend: passes without cracking; Cross-cut adhesion (ASTM D-3359):5.

EXAMPLE 7

Melamine Coating

The terpolymer of Example 1 (21 g) is dissolved in methyl amyl ketone (9 g) and butyl acetate (9 g). To the solution is added CYMEL 303 melamine resin (9 g, product of American Cyanamid) and CYCAT 4040 catalyst (40% p-toluenesulfonic acid in isopropyl alcohol, 0.7 g, product of American Cyanamid). After mixing well, a portion of the coating solution is poured onto clean steel panels and is drawn down to a uniform wet film of thickness about 0.003" with a doctor blade. The panels are dried in a hood for 30 min., and then baked in an oven at 150° C. for 30 min. Testing of the panels gives the following results: Reverse impact: 5 in/lb; Pencil hardness: 3H; Gloss at 20°:120; Gloss at 60°:135.

EXAMPLE 8

Melamine Coating

The terpolymer of Example 3 (21 g) is dissolved in MAK (9 g) and butyl acetate (9 g). To the solution is added CYMEL 303 melamine resin (9 g) and CYCAT 4040 catalyst (0.7 g). After mixing well, a portion of the coating solution is poured onto clean steel panels and is drawn down to a uniform wet film of thickness about 0.003" with a doctor blade. The panels are dried in a hood for 30 min., and then baked in an oven at 150° C. for 30 min. Testing of the panels gives the following results: Reverse impact: 5 in/lb; Pencil hardness: H; Gloss at 20°:120; Gloss at 60°:125.

EXAMPLE 9

Preparation of a Thermoset Polyester Coating

In this example, an allyl alcohol/allyl butyrate/methyl methacrylate terpolymer is formulated into a thermosetting polyester coating. The terpolymer of Example 1 (1904 g) and isophthalic acid (94 g) are charged into a reactor and heated to 220° C. while sparging nitrogen through the mixture. After the acid number reaches 60–70 mg KOH/g, adipic acid (73 g), isophthalic acid (60 g), and maleic anhydride (6 g) are added, and the mixture is reheated to 220° C. Heating continues at 220° C. until the acid number drops to 10–12 mg KOH/g. 2-Ethoxyethanol acetate (500 g) is Six hundred grams of the resulting polyester solution is charged into a reactor equipped with an agitator, thermometer, reflux condenser, addition funnel, and nitrogen inlet, and the mixture is heated to 120° C. A mixture of 2-hydroxyethyl acrylate (10 g), ethyl acrylate (54 g), styrene (5 g), methyl methacrylate (20 g), methacrylic acid (2 g), and di-t-butylperoxide (1.0 g) is charged to the addition funnel. The acrylate monomer mixture is added to the polyester mixture over 2 h, and is then kept at 120° C. for another hour. t-Butyl perbenzoate (0.2 g) is added, and the mixture is kept at 120° C. for another 2 h. A second 0.2 g portion of t-butyl perbenzoate is added, and heating continues for another 2 h. The product solution is finally diluted with 1-butanol (30 g) and xylene (20 g). This solution is expected to be useful as a thermosettable coating. The solution can be applied as a film, and allowed to cure at room temperature or elevated temperature.

EXAMPLE 10

Preparation of an Alkyd Coating

In this example, an alkyd coating is prepared from an allyl alcohol/allyl butyrate/methyl methacrylate terpolymer.

The terpolymer of Example 1 (331 g), safflower oil (64 g), lithium hydroxide (0.03 g), phthalic anhydride (25.5 g), maleic anhydride (0.22 g), triphenyl phosphite (0.07 g), and xylene (18 g) are charged into a reactor equipped with an agitator, thermometer, reflux condenser with a Dean-Stark trap, and nitrogen inlet. The mixture is heated to 240° C., and is kept at that temperature until the acid number drops to 10–20 mg KOH/g. After the reaction, xylene is added to dilute the mixture to 50 wt. % solids. This solution is expected to be useful as an alkyd coating. The solution can be applied as a film, and allowed to cure at room temperature or at elevated temperature.

EXAMPLE 11

Preparation of a Curable Acrylate Composition

In this example, a curable acrylate composition is prepared from an allyl alcohol/allyl butyrate/methyl methacrylate terpolymer.

The terpolymer of Example 2 (100 g), acrylic acid (13.8 g), toluene (20 g), hydroquinone (0.15 g), and sulfuric acid (0.15 g), are charged into a reactor equipped with an agitator, thermometer, reflux condenser with Dean-Stark trap, and nitrogen inlet. The mixture is heated to reflux (about 100° C. to 115° C.), and water (3.4 g) is removed using the trap. After no additional water is being produced, the toluene is removed by vacuum distillation. The expected product is a copolymer of allyl alcohol and allyl acetate in which most or all of the hydroxyl groups from the original copolymer are converted to acrylate ester groups.

The preceding examples are meant only as illustrations. The following claims define the scope of the invention.

I claim:

1. A terpolymer which comprises recurring units of:
   (a) an allyl ester of the formula $CH_2=CR'-CH_2-O-CO-R$ in which R is hydrogen or a saturated linear, branched, or cyclic $C_1-C_{30}$ alkyl, aryl, or aralkyl group, and R' is selected from the group consisting of hydrogen and $C_1-C_5$ alkyl;
   (b) an allylic alcohol of the formula $CH_2=CR'-CH_2-OH$ in which R' is selected from the group consisiting of hydrogen and $C_1-C_5$ alkyl; and
   (c) a vinyl monomer selected from the group consisting of vinyl aromatic monomers, vinyl halides, vinyl ethers, acrylonitrile, methyacrylonitrile, acrylamide, methacrylamide, acrylates, methacrylates, and vinyl esters;
   wherein the terpolymer has an average hydroxyl functionality within the range of about 2 to about 10, and a number average molecular weigth within the range of about 300 to about 15,000.

2. The terpolymer of claim 1 wherein the allyl ester has the formula $CH_2=CH-CH_2-O-CO-R$ in which R is a $C_1-C_5$ alkyl group.

3. The terpolymer of claim 1 wherein the allylic alcohol is selected from the group consisting of allyl alcohol and methallyl alcohol.

4. The terpolymer of claim 1 having from about 1 to about 98 wt. % of the allyl ester, from about 1 to about 98 wt. % of the allylic alcohol, and from about 1 to about 98 wt. % of the vinyl monomer.

5. The terpolymer of claim 1 having a hydroxyl number within the range of about 10 mg KOH/g to about 950 mg KOH/g.

6. The terpolymer of claim 1 having a number average molecular weight within the range of about 500 to about 3000, and a hydroxyl number within the range of about 25 mg KOH/g to about 500 mg KOH/g.

7. A polymer blend which comprises:
   (a) a terpolymer which comprises recurring units of:
      (1) an allyl ester of the formula $CH_2=CR'-CH_2-O-CO-R$ in which R is hydrogen or a saturated linear, branched, or cyclic $C_1-C_{30}$ alkyl, aryl, or aralkyl group, and R' is selected from the group consisting of hydrogen and $C_1-C_5$ alkyl; and
      (2) an allylic alcohol of the formula $CH_2=CR'-CH_2-OH$ in which R' is selected from the group consisting of hydrogen and $C_1-C_5$ alkyl; and
      (3) a vinyl monomer selected from the group consisting of vinyl aromatic monomers, vinyl halides, vinyl ethers, acrylonitrile, methyacrylonitrile, acrylamide, methacrylamide, acrylates, methacrylates and vinyl esters; said terpolymer having an average hydroxyl functionality within the range of about 2 to about 10, and a number average molecular weight within the range of about 300 to about 15,000; and
   (b) one or more polymers selected from the group consisting of polyether polyols, phenolic resins, acrylates, and epoxy resins.

* * * * *